(12) United States Patent
Okvist et al.

(10) Patent No.: US 8,391,912 B2
(45) Date of Patent: Mar. 5, 2013

(54) BIT-RATE PREDICTION

(75) Inventors: Peter Okvist, Lulea (SE); Anders Hedlund, Skelleftea (SE); Kjell Larsson, Lulea (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 165 days.

(21) Appl. No.: 12/999,462

(22) PCT Filed: Jun. 19, 2008

(86) PCT No.: PCT/SE2008/050736
§ 371 (c)(1),
(2), (4) Date: Dec. 16, 2010

(87) PCT Pub. No.: WO2009/154528
PCT Pub. Date: Dec. 23, 2009

(65) Prior Publication Data
US 2011/0086666 A1 Apr. 14, 2011

(51) Int. Cl.
*H04W 52/02* (2009.01)
*H04B 7/00* (2006.01)
(52) U.S. Cl. .................. 455/522; 455/452.2; 455/67.11; 455/69
(58) Field of Classification Search .................. 455/522, 455/69, 452.2, 515, 68, 67.13, 434, 426.1, 455/509, 67.11, 115.1, 126; 370/230, 252
See application file for complete search history.

(56) References Cited

U.S. PATENT DOCUMENTS

| 2005/0259582 | A1 | 11/2005 | Belaiche |
| 2008/0212468 | A1* | 9/2008 | Wigard et al. ............. 370/230 |
| 2011/0105174 | A1* | 5/2011 | Pelletier et al. ........... 455/522 |
| 2011/0171991 | A1* | 7/2011 | Liu et al. .................. 455/522 |

FOREIGN PATENT DOCUMENTS

| WO | 2007/091941 A1 | 8/2007 |
| WO | 2008/118081 A2 | 10/2008 |

\* cited by examiner

*Primary Examiner* — John J Lee
(74) *Attorney, Agent, or Firm* — Coats & Bennet, P.L.L.C.

(57) ABSTRACT

The present invention is directed to a method for predicting a bit rate provided by an enhanced data channel in a future radio channel, once the future radio channel is added to an ordinary data channel in an operational radio channel. It is assumed that the bit-rate provided by the enhanced data channel is indicated by the ratio (A), wherein E is the enhanced data channel power offset, E is the ordinary control channel power offset after a future addition and $k_1$ is a constant. The method comprises with respect to the operational radio channel the steps of obtaining a first transmit power $P_1$, a first quality target $Q_1$, the power offset O for an ordinary control channel and the power offset O for the ordinary data channel. In addition, the method comprises with respect to the future radio channel the steps of obtaining a second transmit power $P_2$ and a second quality target $Q_2$. The ratio (A) indicating said bit-rate is then obtained by the step of using the expression (B) wherein k2 and k3 are predetermined constants.

20 Claims, 4 Drawing Sheets

| E-TFC | Bit-Rate Information |
|-------|----------------------|
| 1     | y1                   |
| 2     | y2                   |
| ⋮     | ⋮                    |
| 128   | y128                 |

Fig. 5

BIT-RATE PREDICTION

TECHNICAL FIELD

The invention relates to communication between nodes in a wireless communication network. In particular, the invention relates to prediction of the bit rate in communication between nodes in a wireless communication network.

BACKGROUND OF THE INVENTION

High capacity communication performed by means of wireless transmissions is today a common phenomenon.

The development and deployment of so called cellular network and similar have been particularly successful. A cellular network is a radio network made up of a number of radio cells (or just cells) each served by a fixed transmitter, known as a cell site or base station. The cells are used to cover different areas in order to provide radio coverage over a wider area than the area of one cell. Cellular networks are inherently asymmetric with a set of fixed main transceivers each serving a cell and a set of distributed (generally, but not always, mobile) transceivers which provide services to the network's users.

The most common example of a cellular network is a mobile phone (cell phone) network. A mobile phone is a portable telephone which receives or makes calls through a cell site (base station). Radio waves are used to transfer signals between the cell cite and the cell phone.

There are a number of different cellular technologies, including but not limited to: Global System for Mobile Communications (GSM), General Packet Radio Service (GPRS), Code Division Multiple Access (CDMA), Wideband Code Division Multiple Access (WCDMA), Evolution-Data Optimized (EV-DO), Enhanced Data Rates for GSM Evolution (EDGE), Digital Enhanced Cordless Telecommunications (DECT), Digital AMPS (IS-136/TDMA), Integrated Digital Enhanced Network (iDEN) and similar.

The WCDMA in particular is a type of Third Generation (3G) cellular network using the higher speed transmission protocol e.g. provided in the Japanese Freedom of Mobile Multimedia Access systems (FOMA), which is the brand name for the 3G services being offered by Japanese mobile phone operator NTT DoCoMo. The WCDMA is also used as the underlying air interface in the Universal Mobile Telecommunications System (UMTS) being standardized by the Third Generation Partnership Project (3GPP).

More technically, WCDMA is a wideband spread-spectrum mobile air interface that utilizes the direct-sequence spread spectrum method of asynchronous code division multiple access to achieve higher speeds and support more users compared to the implementation of time division multiplexing (TDMA) used by 2G GSM networks.

In release 6 of the 3GPP WCDMA specifications, support for high speed uplink packet data transmission (Enhanced Uplink, EUL) from the User Equipment (UE) to the base station (i.e. Node B) was improved by means of a new uplink transport channel, Enhanced Dedicated Channel (E-DCH) being added to the ordinary Dedicated Channel (DCH) defined in the UMTS release 99 (R99). The E-DCH supports higher data rates, Node B HARQ with soft combining and a fast Node B scheduling.

It is expected that the EUL eventually will replace ordinary UMTS release 99 (R99) uplink solutions, at least in hot spots and for bit rate demands that R99 solutions cannot cope with. Examples of this might be that VoIP (Voice over Internet Protocol, VoIP) replaces CS speech (Circuit Switched, CS), and that services requiring higher bit rates for example to cope with photo and video upload, are/will be deployed on E-DCH instead of R99 DCH.

As is well known, the DCH comprises a Dedicated Physical Control Channel (DPCCH) and a Dedicated Physical Data Channel (DPDCH). The DPCCH is the physical channel on the radio interface (Uu) on which the physical layer (layer 1) control signaling is transmitted, both on the uplink by the User Equipment (UE) to the Node B (the base transceiver station) and on the downlink by the Node B to the UE. Similarly, the DPDCH is the physical channel on the radio interface (Uu) on which the payload (e.g. IP data, voice etc) as well as higher layer signalling (e.g. Radio Resource Control, RRC and Non Access Stratum, NAS signalling) is transmitted both, on the uplink by the UE to the Node B and on the downlink by the Node B to the UE.

Similarly, it is also well known that the E-DCH comprises an Enhanced Dedicated Physical Control Channel (E-DPCCH) and an Enhanced Dedicated Physical Data Channel (E-DPDCH). The E-DPCCH and E-DPDCH of the E-DCH correspond to the DPCCH and DPDCH respectively of the DCH.

Now, according to the 3GPP standards a Transport Format Combination (TFC) has to be selected for a DCH. Similarly, an Enhanced Transport Format Combination (E-TFC) has to be selected for an E-DCH. As is well known, the transport format (TFC, E-TFC) determines the amount of data that can be sent during one transmission time interval by the control channel (DPCCH, DPDCH) and the data channel (E-DPCCH, E-DPDCH) forming the transport channel (DCH, E-DCH).

Typically, a Transport Format Combination (TFC; E-TFC) is selected according to a selection mechanism operating on network parameters indicative of the operational conditions of the control channel (DPCCH, E-DPCCH) and the data channel (DPDCH, E-DPDCH) and an array or a table or similar having a plurality of entries (e.g. 0-127 positions or similar). Each entry is represented and/or pointed out by a Transport Format Combination Indicator (TFCI, E-TFCI)

Figure 5:
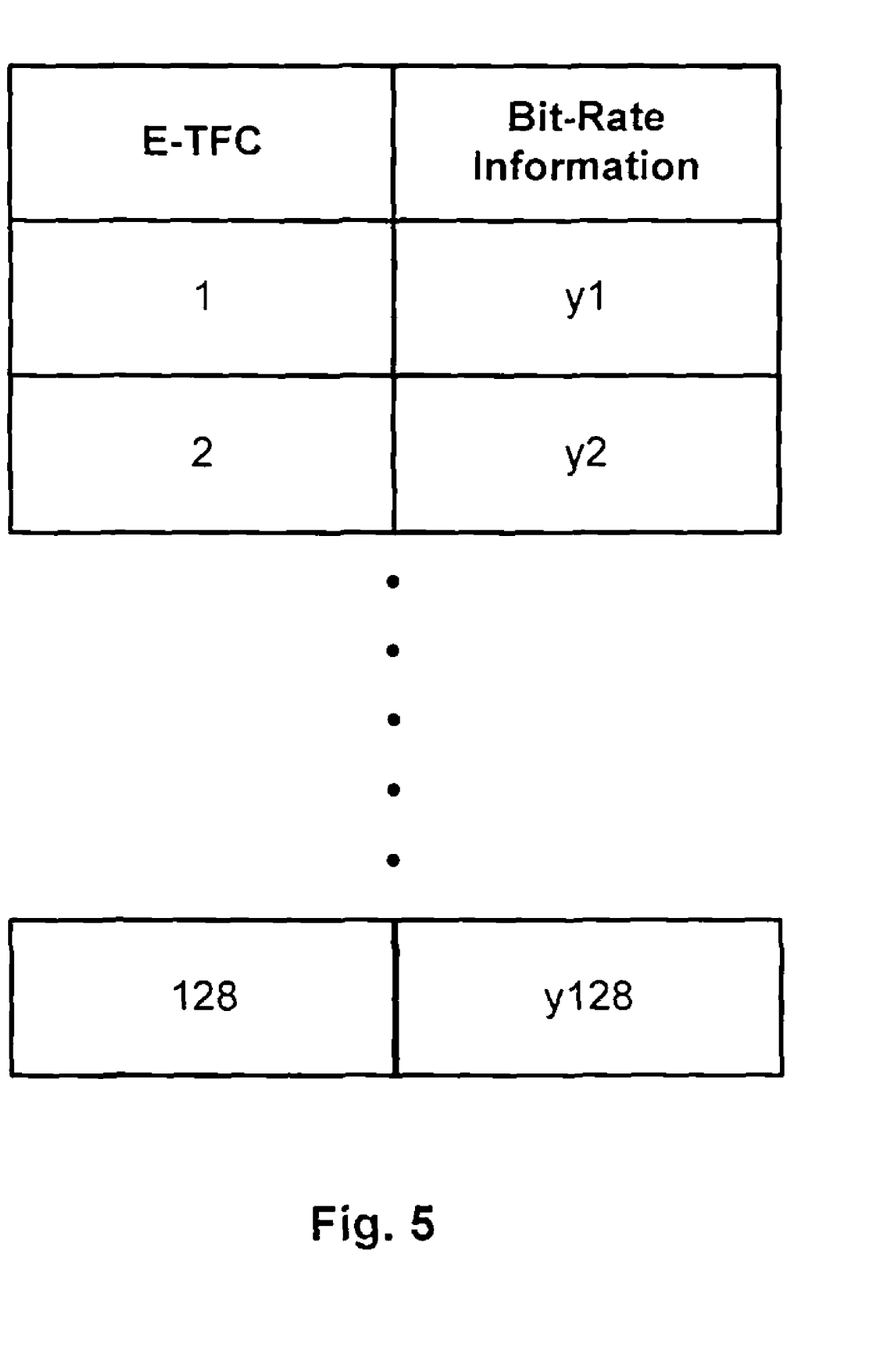
FIG. 5 is a schematic illustration of an exemplifying E-TFC table.

FIG. 5 is a schematic illustration of an exemplifying E-TFC table comprising 128 entries, wherein each entry comprises Bit-Rate Information y1-y128 comprising information about the bit-rate that can be supported and used by the data channel (E-DPDCH) of the transport channel (E-DCH) in a particular operational environment.

The Bit-Rate Information may e.g. comprise information about the transport block size, number of codes, spreading factor and similar to be used for the data channel E-DPDCH, and/or indicate the power ratio for the E-DPDCH and the DPCCH, the modulation to be used and/or the error correction to be used, or some other indication that separately or in combination with other indications in the Bit-Rate information can be used to directly or indirectly indicate the bit-rate for the data channel (E-DPDCH). Indeed, this does not preclude that the Bit-Rate information may comprise one or several indications that directly define the bit-rate for the data channel (E-DPDCH).

The selection of an E-TFC in an E-TFC table or similar as briefly indicated above is well known from the 3GPP specification and by those skilled in the art and it needs no further description. However, some details relevant to embodiments of the present invention will be briefly elaborated below.

The procedures for selecting an E-TFC e.g. described in the 3GPP specification TS 25.133 V6.20 (2007-12) (see chapter 6.4 Transport Format Combination Selection in UE), brings that the available power to be used by the E-DCH data channel (E-DPDCH), normalized with the DPCCH power, can be written as:

$$NRPM_j = (P_{Max,j} - P_{DPCCH} - P_{DPDCH} - P_{HS\text{-}DPCCH} - P_{E\text{-}DPCCH})/P_{DPCCH} \quad (1)$$

wherein, $NRPM_j$ is the Normalised Remaining Power Margin, $P_{Max,j}$ is the maximum UE transmitter power for E-TFC j, $P_{DPCCH}$ represents an estimate of the current UE DPCCH power, $P_{DPDCH}$ is the estimated DPDCH transmit power (based on $P_{DPCCH}$ and the gain factors from the TFC selection that has already been made), $P_{HS\text{-}DPCCH}$ represents estimated High-Speed DPCCH transmit power based on the maximum HS-DPCCH gain factor based on $P_{DPCCH}$ and the most recent signalled values of the power adjustment factor with respect to ACK, NACK and CQI, $P_{E\text{-}DPCCH}$ is the estimated E-DPCCH transmit power, based on $P_{DPCCH}$ and the E-DPCCH gain factor calculated using the most recent signalled reference power value of E-DPCCH.

All powers are considered in linear power units, and special care must be taken in case of compressed mode.

It should further be noted that the power for e.g. the DPDCH can be written as:

$$P_{DPDCH} = \frac{\beta_d^2}{\beta_c^2} P_{DPCCH}, \quad (2)$$

wherein $\beta_c$, $\beta_d$ represents power offset factor for DPCCH, DPDCH, respectively.

Furthermore, by using (2), (1) can be rewritten as:

$$NRPM_j = \left( \frac{PMax_j - P_{DPCCH} - P_{DPDCH} -}{P_{HS\text{-}DPCCH} - P_{E\text{-}DPCCH}} \right) / P_{DPCCH} \quad (3)$$

$$= \frac{PMax_j}{P_{DPCCH}} - \frac{\beta_c^2 + \beta_d^2 + \beta_{hs}^2 + \beta_{ec}^2}{\beta_c^2},$$

wherein $\beta_{ec}$ and $\beta_{hs}$ represents power offset factor for E-DPCCH and HS-DPCCH, respectively.

Omitting the HS-part (with the assumption of no parallel HS traffic or that the HS channels are not a significant part of the maximum possible UE power) and E-DPCCH due to rather low power and simplicity, and assuming that NRPM corresponds to the maximum value of $\beta_{ed}^2/\beta_c^2$, you have that:

$$NRPMj = \frac{\beta_{ed}^2}{\beta_c^2} = \frac{PMax_j}{P_{DPCCH}} - \frac{\beta_c^2 + \beta_d^2}{\beta_c^2} \quad (4)$$

where $\beta_{ed}$ is the power offset factor for E-DPDCH.

So, in a scenario were you know the power offset factors $\beta_c$, $\beta_d$ as well as the maximum power $P_{Max,j}$ (i.e. the maximum available/allowed power for all above mentioned channels) and the control power level $P_{DPCCH}$, you can calculate the remaining normalized power that the E-DPDCH can use. With some simplifications, this is the calculation scheme for the E-TFC selection mechanism, where the relation $\beta_{ed}^2/\beta_c^2$ corresponds to a specific E-TFC comprising Bit-Rate Information corresponding to the bit-rate that can be supported and used by the E-DPDCH as previously described.

It should be emphasised that the calculation scheme for the E-TFC selection implying a certain E-DPDCH bit-rate as described above assumes a possible parallel operation of DCH and E-DCH, which means that the WCDMA network have been configured to let $\beta_d$, $\beta_{ed}$ and $\beta_c$ coexist given a particular available remaining power margin $NRPM_j$ to be used by the E-DPDCH. Henceforth, power offset factors that reflect a DCH and an E-DCH existing/deployed in parallel will be denoted as $\beta_{d,E\text{-}DCH}$, $\beta_{ed,E\text{-}DCH}$ and $\beta_{c,E\text{-}DCH}$, respectively. Similarly, power offset factor representing a scenario with only DCH present will henceforth thus be denoted as $\beta_{d,DCH}$ and $\beta_{c,DCH}$, respectively.

Now, before deploying EUL with a DCH and an E-DCH in parallel, the network planning would benefit from a prediction of the future E-DPDCH bit-rate that can be obtained when the single DCH in the UMTS R99 is replaced by EUL operating a DCH and E-DCH in parallel. Here, it would be tempting to use the above calculation scheme for the E-TFC selection to predict an E-DPDCH bit-rate. However, the existing R99 WCDMA network is configured so that only $\beta_{d,DCH}$ and $\beta_{c,DCH}$ coexists in a preferred and/or optimized manner. There is consequently no remaining power margin $NRPM_j$ to be used by an E-DPDCH, i.e. there is no $\beta_{ed,E\text{-}DCH}$ offset in the exiting R99 network. It follows that the above calculation scheme, e.g. represented by the expression (4), cannot properly be used to predict a contemplated selection E-TFC and thus a future E-DPDCH bit-rate. Also, the used power for the PDPCCH will not apply for EUL. Moreover, a further reason to distinguish between e.g. $\beta_{c,DCH}$ and $\beta_{d,DCH}$ on one hand and on the other hand $\beta_{c,E\text{-}DCH}$ and $\beta_{d,E\text{-}DCH}$, is that you might need to set some of the power offsets differently as E-DCH is deployed; the power relation e.g. between DPCCH and DPDCH in case E-DCH is deployed will not necessarily be similar to the corresponding relation present when only DCH is present. Further, when an E-DCH is used the quality target used by the power control might be changed which makes the DPCCH power in (4) incorrect.

Nevertheless, there are other methods that can be used to predict the E-DPDCH bit-rate for a given area or position in a cell. Such methods often use theoretical pen and paper calculations or dynamical/semi-dynamical or static system simulations, or similar. These methods provide good accuracy and catch many detailed system aspects, but they require access to proper input data (e.g. cell deployment information and user mobility information etc) for the specific area, but also significant computational time. Additionally, to build and maintain detailed simulation tools requires specific competence that a person on the field not necessarily holds.

It would therefore be fruitful to have some kind of E-DPDCH bit-rate estimating/prediction method that could be used in field, not requiring significant CPU time and specialized radio algorithm competence. Such methodology would preferably use such input information that already is available in the network prior to EUL deployment.

SUMMARY OF THE INVENTION

Embodiments herein eliminate or reduce at least one of the disadvantages discussed in the background above.

In an embodiment of the present invention the forthcoming E-DPDCH bit-rate is predicted by analysis of already available R99 measures; i.e. using knowledge of E-DCH power allocation principles and how these relate to R99 equivalents to predict bit-rate possible for the E-DPDCH to achieve.

The above has been accomplished by a first method for predicting a bit rate provided by an enhanced data channel in a future radio channel, once the future radio channel is added to an ordinary data channel in an operational radio channel. It is assumed that the bit-rate provided by the enhanced data channel is indicated by the ratio $E_d^{k1}/E_{oc}^{k1}$, wherein $E_d$ is the enhanced data channel power offset, $E_{oc}$ is the ordinary control channel power offset after a future addition and $k_1$ is a constant. The method comprises with respect to the operational radio channel the steps of obtaining a first transmit power $P_1$, a first quality target $Q_1$, the power offset $O_c$ for an ordinary control channel and the power offset $O_d$ for the ordinary data channel. In addition, the method comprises with respect to the future radio channel the steps of obtaining a second transmit power $P_2$ and a second quality target $Q_2$. The ratio $E_d^{k1}/E_{oc}^{k1}$ indicating said bit-rate is then obtained by the step of using the expression $$\left(\frac{P_2 \cdot Q_1}{P_1 \cdot Q_2}\right) \cdot \left(k2 + \frac{O_d^{k1}}{O_c^{k1}}\right) - k3$$

wherein k2 and k3 are predetermined constants.

An embodiment of the first method is illustrated by expressions 7 and 7' which will be elaborated later. The method makes it possible to obtain a predicted EUL bit rate in a specific area not using advanced system simulation tools or similar. The method is fast in that sense that the need for CPU/post-processing time is reduced. It is also well suited for implementation in typical mobile test equipment targeting drive tests, or equivalent.

The above has also been accomplished by a second method comprising the features of the first method. The second method is characterized with respect to the operational radio channel by the steps of obtaining parameters indicative of an orthogonality factor, a path gain and other user's interference. The second method is further characterized by the steps of obtaining a first interference $I_1$ experienced by the operational radio channel by using said indicative parameters and the first transmit power, and a second interference $I_2$ that will be experienced by the future radio channel using said indicative parameters and the second transmit power. The ratio $E_d^{k1}/E_{oc}^{k1}$ indicating said bit-rate is then obtained by the step of using the expression $$\left(\frac{P_2 \cdot Q_1}{P_1 \cdot Q_2} \cdot \frac{I_1}{I_2}\right) \cdot \left(k2 + \frac{O_d^{k1}}{O_c^{k1}}\right) - k3.$$

An embodiment of the second method is illustrated by expressions 10 and 10' which will be elaborated later. The second method takes into account that the interference may change when the future radio channel is added to the operational radio channel. The first method is simplified by assuming that the interference remains the same before and after addition. Hence, the second method is a refinement of the first method.

The above has also been accomplished by a third comprising the features of the second method. The third method is characterized with respect to the operational radio channel by the steps of obtaining after said future addition parameters indicative of the ordinary control channel power offset $E_{oc}$, an ordinary data channel power offset $E_{od}$ and a high speed control channel power offset $E_{hs,oc}$. The third method is further characterized with respect to the future radio channel by the steps of obtaining parameters indicative of an enhanced control channel power offset $E_c$. The ratio $E_d^{k1}/E_{oc}^{k1}$ indicating said bit-rate is then obtained by the step of using the expression $$\left(\frac{P_2 \cdot Q_1}{P_1 \cdot Q_2} \cdot \frac{I_1}{I_2}\right) \cdot \left(k2 + \frac{O_d^{k1}}{O_c^{k1}}\right) - \left(k3 + \frac{E_{od}^{k1}}{E_{oc}^{k1}} + \frac{E_c^{k1}}{E_{oc}^{k1}} + \frac{E_{hs,oc}^{k1}}{E_{oc}^{k1}}\right).$$

An embodiment of the third method is illustrated by expressions 11 and 11' which will be elaborated later. The third method takes into account that, in addition to the enhanced data channel in the future radio channel and the ordinary data channel in the operational radio channel, there may be further data channels and control channels supported by the operational radio channel and the future radio channel. The first method and the second method are simplified by assuming that there are no such further channels. Hence, the third method is a refinement of the first method and second method.

Further advantages and advantageous features of the invention are disclosed in the following description and in the dependent claims.

It should be emphasized that the term "comprises/comprising" when used in this specification is taken to specify the presence of stated features, integers, steps or components, but does not preclude the presence or addition of one or more other features, integers, steps, components or groups thereof.

BRIEF DESCRIPTION OF THE DRAWINGS

A more detailed description of the present invention is given below with reference to a plurality of exemplifying embodiments as illustrated in the appended figures, wherein.

DETAILED DESCRIPTION OF PREFERRED EMBODIMENTS

Figure 1:
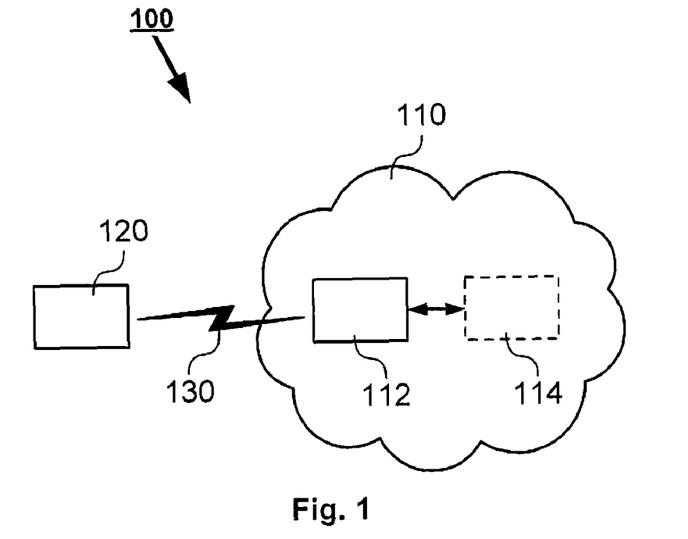
FIG. 1 is a schematic illustration of an exemplifying wireless communication system 100 according to an embodiment of the present invention.

FIG. 1 is a schematic illustration of an exemplifying wireless communication system 100 according to an embodiment of the present invention. It is preferred that the exemplifying wireless communication system 100 is a cellular communication system, e.g. according to the 3GPP specifications.

As can be seen in FIG. 1, the exemplifying communication system 100 comprises a communication network 110 and one or more mobile terminals 120. The communication network 110 comprises at least a first node arrangement 112. The first node arrangement 112 may be connected to further nodes in the communication network 110. The first node arrangement 112 may itself comprise several nodes. The first node arrangement 112 may e.g. form the radio access network of the communication system 110. In particular, the first node arrangement 112 may be or comprise a base station arrangement and/or a base station controller arrangement, e.g. a Node B. The first node arrangement 112 is arranged to operatively enable wireless communication between the terminal(s) 120 and the communication network 110 via an air interface 130.

In addition, the communication network 110 may comprise at least a second node arrangement 114 that is adapted to be operatively connected to the first node arrangement 112. The second node arrangement 114 may in turn be connected to further nodes in the communication network 100. The second node arrangement 114 may itself comprise several nodes. The second node arrangement 114 may e.g. form the core net-work of the communication network 110 or at least parts of the core network. The second node arrangement 114 is adapted to operatively control the operation of the first node arrangement 112, e.g. arranged to operatively control the overall character of the up-link and down-link communication preformed by the first node arrangement 112 with respect to the terminal(s) 120.

The terminal(s) 120 is preferably an User Equipment (UE) or similar and the air interface 130 over which the first node arrangement 112 and the UE(s) 120 operatively communicates is preferably based on WCDMA, e.g. such as the Uu interface being the radio interface between UTRAN and the UE as defined in the 3GPP specifications.

Figure 2:
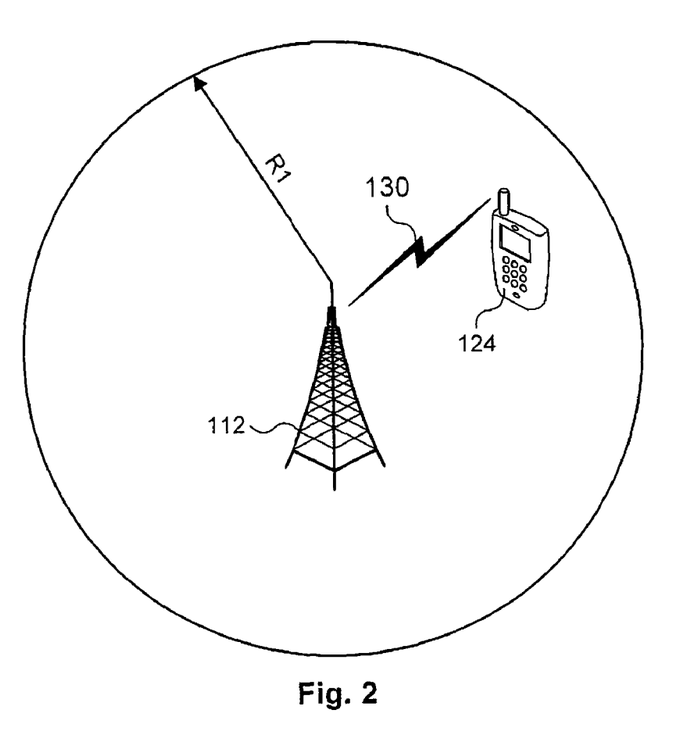
FIG. 2 is a schematic illustration of a bit-rate prediction device 124 arranged within the coverage area of the first node arrangement 112.

FIG. 2 is a schematic illustration of a bit-rate prediction device 124 arranged within the coverage area of the first node arrangement 112, preferably within a cell or in other words within the coverage area of at least one base station such as a Node B comprised by the first node arrangement 112. In FIG. 2 the coverage area have been indicated by a circle with a radius R1.

Figure 3:
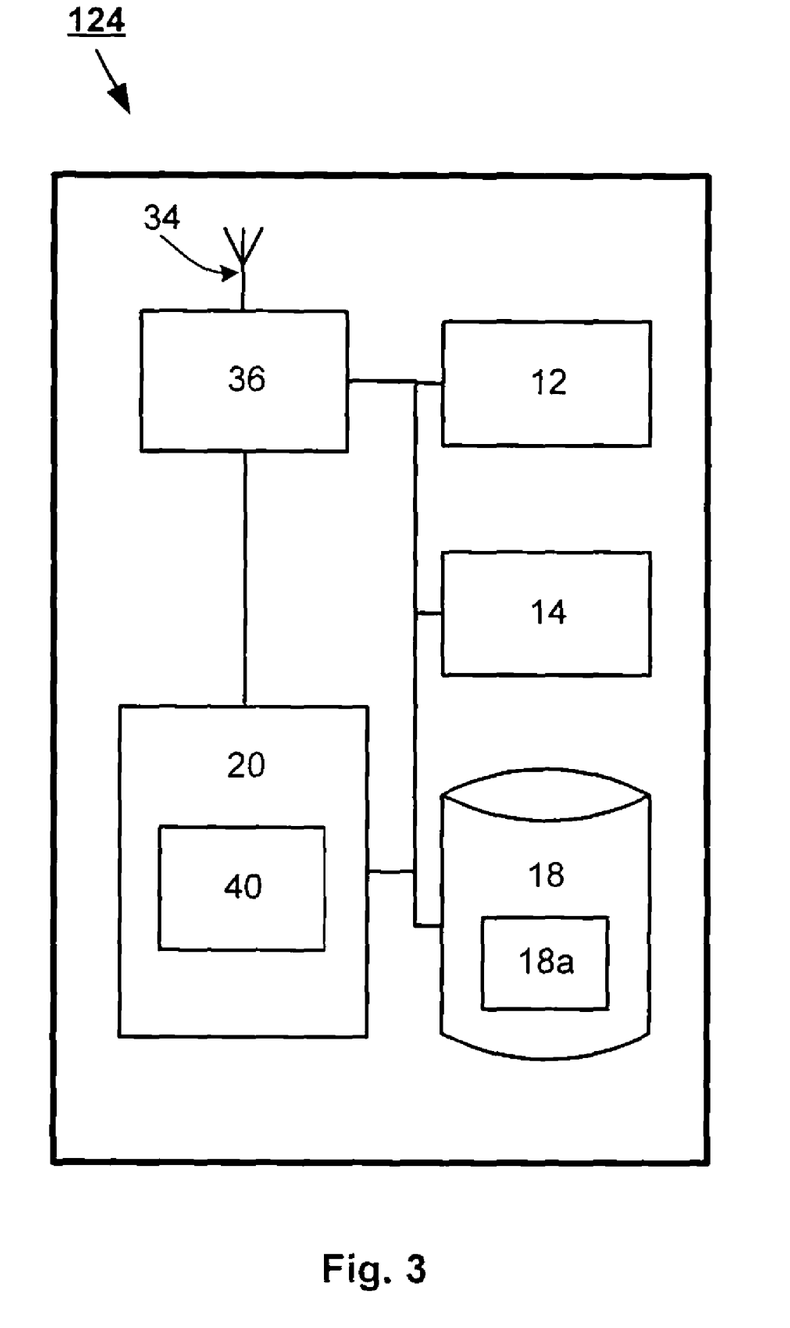
FIG. 3 shows parts of the interior of the bit-rate prediction device 124 being relevant for the present invention.

FIG. 3 shows parts of the interior of the bit-rate prediction device 124 being relevant for the present invention. The bit-rate prediction device 124 may e.g. be implemented by means of a computer provided with various bit-rate prediction features as described below, e.g. a customized PC or similar arranged in a vehicle or a customized laptop or similar to be carried by an operator etc. It should be emphasized that the bit-rate prediction device 124 may comprise one or several units that may be arranged in a single device and/or arranged in separate devices that are connected in a suitable manner via cables and/or air interfaces or similar, e.g. a lap top or similar provided with the appropriate software and hardware being connected to a cell phone. Indeed, the bit-rate prediction device may even be implemented in a cell phone or similar.

It is preferred that the prediction device 124 comprises a keypad 12 and a display 22. In addition, the prediction device 124 is preferably provided with a memory arrangement 18 for storing e.g. storing system files and/or data files etc. The memory arrangement 18 may e.g. be any suitable known memory or combination of memories used in portable devices of today.

It is particularly preferred that the memory 18 comprises an E-TFC table 18a or similar comprising a number of entries, wherein each entry corresponds to an E-TFC indicating a particular Bit-Rate Information as discussed in the background above with reference to FIG. 5. Hence, the E-TFC table 18a comprises Bit-Rate Information y1-y128 corresponding to the bit-rate that can be supported and used by the data channel (E-DPDCH) of the transport channel (E-DCH) in a particular operational environment. In particular it is preferred that the Bit-Rate Information of the E-TFC table comprises information that indicates the power ratio or similar relation between the E-DPDCH and the DPCCH. However, it should be emphasised that the Bit-Rate Information comprised by table 18a must not be comprised by the memory 18. On the contrary, the Bit-Rate Information may additionally and/or alternatively be requested by the prediction device 124 from the node arrangement 112 (e.g. a Node B comprised by the node arrangement 112) and/or to the higher functions of the network 110.

Moreover, it is preferred that the bit-rate prediction device 124 comprises an antenna arrangement 34 connected to a radio circuit 36 for receiving and/or recording communication occurring over the air interface 130. It is more preferred that the antenna arrangement 34 and the radio circuit 36 are adapted to enable communication with the network 110 in FIG. 1 via the first node arrangement 112 over the air interface 130, e.g. via a base station such as a Node B or similar. Such antenna arrangements and radio circuits are deployed in modern cell phones and they are well known to those skilled in the art.

The bit-rate prediction device 124 is also provided with a control unit 20 for controlling and supervising the operation of the rate prediction device 124. The control unit 20 may be implemented by means of hardware and/or software, and it may comprise one or several hardware units and/or software modules, e.g. one or several processor units provided with or having access to the appropriate software and hardware required for the functions to be performed by the prediction device 124. As can be seen in FIG. 3, it is preferred that the control unit 20 is connected—directly or indirectly—to the keypad 12, the display 22, the radio unit 36 and to the memory 18. This provides the control unit 20 with the ability to control and communicate with these units to e.g. exchanging information and instructions with the units.

Furthermore, as can be seen in FIG. 3 the bit-rate prediction device 124 is provided with a bit-rate prediction control 40. The bit-rate prediction control 40 is of particular interest in connection with the present invention. Being a part of the control unit 20 implies that the bit-rate prediction control 40 can be implemented by means of hardware and/or software and it can comprise one or several hardware units and/or software modules, e.g. one or several processor units provided with or having access to the software and hardware appropriate for the functions required. The prediction device 124 may e.g. comprise the ability to retrieve power levels, power offset factors, interference levels such as Signal to Interference Ratios (SIR) or similar etc. One or several of these parameters or similar may be retrieved by measurements and/or calculations performed on received and/or recorded communication that occurred on the air interface 130. In addition or alternatively, one or several of these parameters or similar may be retrieved by the prediction device 124 sending requests to the first node arrangement 112 (e.g. a Node B comprised by 112) and/or to the higher functions of the network 110. In particular, the bit-rate prediction control 40 is arranged to operatively perform a method for E-DPDCH bit-rate prediction according to the embodiments described below.

Now, in a scenario where you only have R99 traffic, given that Signal to Interference Ratio (SIR) ($\gamma$) for a given link can be written as $\gamma = P \cdot g / I$, where P is the transmitted control channel power, g equals path gain and I represents the experienced interference, and using expression (2) above you get:

$$P_{Tx,DCH} = P_{DPCCH} \cdot \frac{\beta_{c,DCH}^2 + \beta_{d,DCH}^2}{\beta_{c,DCH}^2} \qquad (5)$$

$$= \gamma_{DCH,DPCCH} \cdot \frac{I_1}{g} \cdot \left(1 + \frac{\beta_{d,DCH}^2}{\beta_{c,DCH}^2}\right)$$

wherein $P_{TX,DCH}$ is the transmit power for the DCH data and control channel, and $\gamma_{DCH,DPCCH}$ is the quality target for the DPCCH when only a DCH channel is used. It should be clarified that the $P_{TX,DCH}$ and the power offset factors $\beta_{c,DCH}$, $\beta_{d,DCH}$ can e.g. be obtained by measurements or signalling at the natural and/or original position or place covered by the R99 cell. Additionally or alternatively, parameters indicative of the $P_{TX,DCH}$, and the power offset factors $\beta_{c,DCH}$, $\beta_{d,DCH}$ and/or the $\gamma_{DCH,DPCCH}$ may be obtained from the R99 network, e.g. from a Node B comprised by the node arrangement 112 and/or to the higher functions of the network 110 as schematically illustrated in FIG. 1.

Similarly, for EUL (when no DCH is used) you get:

$$P_{Tx,E-DCH} = \gamma_{E-DCH,DPCCH} \cdot \frac{I_2}{g} \cdot \left(1 + \frac{\beta^2_{ed,E-DCH}}{\beta^2_{c,E-DCH}}\right) \quad (6)$$

wherein $P_{TX,E-DCH}$ is the transmit power for the E-DCH (including DPCCH) and $\gamma_{E-DCH,DPCCH}$ is the quality target for the DPCCH (which is the channel where the inner loop power control operates) when a E-DCH channel is used. It should be clarified that the $P_{TX,E-DCH}$ and the $\gamma_{E-DCH,DPCCH}$ are known and/or determined before replacing the R99 Up-Link (R99 UL) with an Enhanced Up-Link (EUL).

Now, assume that the DCH is deployed in parallel with (i.e. added to) an E-DCH where the E-DCH is ignored and that the interference will not be significantly altered (i.e. $I_1 = I_2 = I$). Using the expression for the E-DCH transmit power (Tx) as in expression (6) in combination with the relation for I/g from expression (5), you get:

$$P_{Tx,E-DCH} = P_{Tx,DCH} \cdot \frac{\gamma_{E-DCH,DPCCH}}{\gamma_{DCH,DPCCH}} \cdot \frac{1 + \frac{\beta^2_{ed,E-DCH}}{\beta^2_{c,E-DCH}}}{1 + \frac{\beta^2_{d,DCH}}{\beta^2_{c,DCH}}}. \quad (7)$$

Expression (7) can be written as:

$$\frac{\beta^2_{ed,E-DCH}}{\beta^2_{c,E-DCH}} = \left(\frac{P_{Tx,E-DCH} \cdot \gamma_{DCH,DPCCH}}{P_{Tx,DCH} \cdot \gamma_{E-DCH,DPCCH}}\right) \cdot \left(1 + \frac{\beta^2_{d,DCH}}{\beta^2_{c,DCH}}\right) - 1 \quad (7')$$

In other words, knowing the power offset factors $\beta_{c,DCH}$, $\beta_{d,DCH}$ as well as the transmit powers $P_{TX,DCH}$, $P_{TX,E-DCH}$ and the quality targets $\gamma_{DCH,DPCCH}$, $\gamma_{E-DCH,DPCCH}$, it is possible to calculate the relation $\beta^2_{ed,E-DCH}/\beta^2_{c,E-DCH}$, which corresponds to a specific E-TFC and hence a specific Bit-Rate Information corresponding to the bit-rate that can be supported and used by the E-DPDCH as previously described.

This can be compared to the above expression (4), wherein similar quantities are calculated via the standardized E-TFC selection algorithm. With the standardized E-TFC selection method, the power left to be used by E-DPDCH is calculated given that DCH and E-DCH are deployed in parallel. Both the SIR for the R99 bearer $\gamma_{DCH,DPCCH}$ and SIR for the bearer to predict the bit rate on, i.e. $\gamma_{E-DCH,DPCCH}$ for the EUL bearer, are needed a priori. Such SIR information could be gathered in advance via live network statistics, or via other methods such as system/link level simulations, using appropriate beta-factor settings.

If we instead assume that the interference changes when the DCH is replaced by the E-DCH (i.e. $I_1 \neq I_2$) but with no further noise rise (i.e. $I_{other}$, interference from other users in the system can be assumed to be unchanged, i.e. users other than the bit-rate prediction device 124), and that the total received uplink power (Received Signal Strength Indicator, RSSI) is signalled from a Node B in the first node arrangement 112 to the UE and that path gain ($\hat{g}$) can be estimated (e.g. assuming the same path loss in both up and down link and then calculate the downlink path loss from CPICH).

The Node B total uplink received power, RSSI, can be derived using the information element UL interference in the System Information Block Type 7 (SIB7) message (ref 3GPP TS 25.331 V8.2.0 (2008-03), chapter 10.2.48.8.10). From this information interference from other sources can be derived as:

$$I_{other} = RSSI - P_{Tx,DCH} \cdot \hat{g} \quad (8)$$

This yields that the experienced interference for the two cases can be expressed according to:

$$I_1 = \alpha \cdot P_{Tx,DCH} \cdot \hat{g} + I_{other} = RSSI - (1-\alpha) \cdot \hat{g} \cdot P_{Tx,DCH},$$

$$I_2 = \alpha \cdot P_{Tx,E-DCH} \cdot \hat{g} + I_{other} = RSSI + (\alpha \cdot P_{Tx,E-DCH} - P_{Tx,DCH}) \cdot \hat{g} \quad (9)$$

where $\alpha$ denotes the down link channel orthogonality factor, i.e. a measure that quantifies the amount of self-interference and interference from orthogonal codes that a WCDMA Rake receiver experiences due to time dispersion. The orthogonality factor can be obtained e.g. either from assumptions based of models or measurements, and it can be assumed that uplink and downlink orthogonality factors are sufficiently equal.

Now using (5), (6) and (9), you get:

$$P_{Tx,E-DCH} = P_{Tx,DCH} \cdot \frac{\gamma_{E-DCH,DPCCH}}{\gamma_{DCH,DPCCH}} \cdot \frac{I_2}{I_1} \cdot \frac{1 + \frac{\beta^2_{ed,E-DCH}}{\beta^2_{c,E-DCH}}}{1 + \frac{\beta^2_{d,DCH}}{\beta^2_{c,DCH}}}. \quad (10)$$

In a similar manner as expression 7, expression (10) can be written as:

$$\frac{\beta^2_{ed,E-DCH}}{\beta^2_{c,E-DCH}} = \left(\frac{P_{Tx,E-DCH} \cdot \gamma_{DCH,DPCCH}}{P_{Tx,DCH} \cdot \gamma_{E-DCH,DPCCH}} \cdot \frac{I_1}{I_2}\right) \cdot \left(1 + \frac{\beta^2_{d,DCH}}{\beta^2_{c,DCH}}\right) - 1 \quad (10')$$

It is worth noticing that omission (i.e. ignoring) of DPDCH, E-DPCCH and HS-DPCCH powers in (3) will impact the accuracy of the prediction derived from (10). Not omitting these reference powers offsets, the full expression for $P_{TX,E-DCH}$ yields:

$$P_{Tx,E-DCH} = P_{Tx,DCH} \cdot \frac{\gamma_{E-DCH,DPCCH}}{\gamma_{DCH,DPCCH}} \cdot \frac{I_2}{I_1} \cdot \quad (11)$$

$$\left(\frac{1 + \frac{\beta^2_{d,E-DCH}}{\beta^2_{c,E-DCH}} + \frac{\beta^2_{ed,E-DCH}}{\beta^2_{c,E-DCH}} + \frac{\beta^2_{ec,E-DCH}}{\beta^2_{c,E-DCH}} + \frac{\beta^2_{hs,E-DCH}}{\beta^2_{c,E-DCH}}}{1 + \frac{\beta^2_{d,DCH}}{\beta^2_{c,DCH}}}\right).$$

If any of these channels are not used, the corresponding beta factor will be zero. It should also be said that an HS channel can exist in the non-E-DCH case, i.e. be present already when the bit rate prediction is performed. In this case a $\beta_{hs,DCH}^2/\beta_{c,DCH}^2$-term will be added in the denominator (i.e. the $1+\beta_{d,DCH}^2/\beta_{c,DCH}^2$-term) in (11), and further on in expression (11').

In a similar manner as expressions 7 and 10, expression (11) can be written as:

$$\frac{\beta_{ed,E-DCH}^2}{\beta_{c,E-DCH}^2} = \left(\frac{P_{Tx,E-DCH} \cdot \gamma_{DCH,DPCCH}}{P_{Tx,DCH} \cdot \gamma_{E-DCH,DPCCH}} \cdot \frac{I_1}{I_2}\right) \cdot \left(1 + \frac{\beta_{d,DCH}^2}{\beta_{c,DCH}^2}\right) - \left(1 + \frac{\beta_{d,E-DCH}^2}{\beta_{c,E-DCH}^2} + \frac{\beta_{ec,E-DCH}^2}{\beta_{c,E-DCH}^2} + \frac{\beta_{hs,E-DCH}^2}{\beta_{c,E-DCH}^2}\right) \quad (11')$$

After deployment as illustrated in expressions (11) and (11'), $\beta_{c,E-DCH}$ is the power offset factor for the DPCCH, $\beta_{d,E-DCH}$ is the power offset factor for the DPDCH, $\beta_{ec,E-DCH}$ is the power offset factor for the E-DPCCH and $\beta_{hs,E-DCH}$ is the power offset factor for the HS channel. The power offset factors $\beta_{c,E-DCH}$, $\beta_{d,E-DCH}$, $\beta_{ec,E-DCH}$ and $\beta_{hs,E-DCH}$ may e.g. be set to values that are likely to be used if/when High Speed Packet Access (HSPA) is deployed. It should also be noted that $P_{TX,E-DCH}$ here contains the power of all used channels, i.e. DPCCH, DPDCH, E-DPDCH, and the HS channel that are used when E-DCH is in operation.

In the above expressions 7, 7'; 10, 10' and 11, 11', different number of retransmission targets are handled via the γ values and a $\beta_{ed,E-DCH}^2/\beta_{c,E-DCH}^2$ table. However, the obtained bit rate supported via the E-TFC lookup is preferably compensated with the used number of expected transmissions. In other words, the actual bit rate provided to an end user may be calculated by compensating said obtained bit rate by a target number of transmissions.

It should also be noted that to find the maximum supported bit rate for EUL, $P_{TX,E-DCH}$ should be as large as possible since higher power will enable higher bit rates. The maximum value of the E-DCH transmission power is approximately equal to $P_{Max}$, (typically 21-23 dBm) in most of the cell.

Potentially, the maximum usable power might be reduced with suitable power headroom (back-off) values, c.f. 3GPP TS 25.133 V6.20 (2007-12), chapter 6.5.

The attention is now directed to the function of an exemplifying embodiment of the present invention. The embodiment is described with reference to FIG. 1-3, and FIG. 4 showing a flowchart illustrating the steps of an exemplifying method providing a prediction of the bit-rate for a future E-DPDCH in EUL. The method is preferably performed by means of the bit-rate prediction control 40 as schematically illustrated in FIG. 3.

Figure 4:
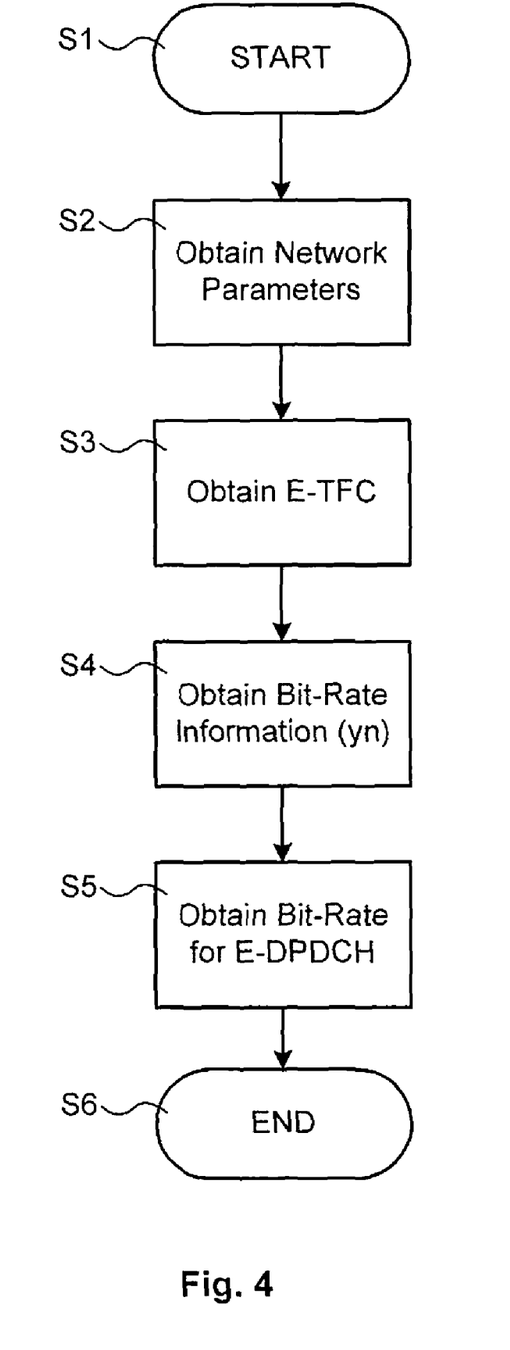
FIG. 4 is a flowchart illustrating the steps of a method according to an exemplifying embodiment of the present invention.

In a first step S1 of the exemplifying method it is preferred that the bit-rate prediction device 124 and hence the bit-rate prediction control 40 are started so as to be able to receive commands from a user of the device 124, preferably via the keypad 12 though other Man-Machine-Interfaces are conceivable. It is further preferred that the bit-rate prediction device 124 is started so that the device 124 is able to receive and/or record communication occurring over the air interface 130 and/or so as to be able to communicate with the network 110 over the air interface 130. Here, it is also preferred that the device 124 is located within the coverage area of a R99 cell in a node arrangement 112 as described above with reference to FIG. 2.

In a second step S2 of the exemplifying method it is preferred that the appropriate R99 network parameters are obtained for the operational cell wherein the device 124 is located. Following expressions (7) and (7') above it is preferred that the network parameters are indicative of the power offset factors $\beta_{c,DCH}$, $\beta_{d,DCH}$, the transmit power $P_{TX,DCH}$ and the quality target $\gamma_{DCH,DPCCH}$ for the existing DCH. One or several of these network R99 parameters may e.g. be measured by the bit-rate prediction device 124 and/or requested by the device 124 from the node arrangement 112 and/or to the higher functions of the network 110. However, this does not preclude that one or several of these parameters are obtained in advance, e.g. by means of previously made measurements and/or simulations etc. It is also preferred that network parameters indicative of the transmit power $P_{TX,E-DCH}$ and the quality target $\gamma_{E-DCH,DPCCH}$ for the future E-DCH are obtained. Typically, these parameters are known and/or can be determined in advance as design assumptions or similar.

In another embodiment following the expressions 10 and 10' above, it is additionally preferred that network parameters indicative of the interference $I_1$ experienced for the DCH and the interference $I_2$ experienced for the E-DCH are obtained. This can e.g. be achieved by utilising the expressions in 9 above or in a similar manner being clear to a person skilled in the art having the benefit of this disclosure.

In still another embodiment following the expressions 11 and 11' above it is additionally preferred that network parameters indicative of the power offset factors power offset factors $\beta_{c,E-DCH}$, $\beta_{d,E-DCH}$, $\beta_{ec,E-DCH}$ and $\beta_{hs,E-DCH}$ are obtained. The power offset factors power offset factors $\beta_{c,E-DCH}$, $\beta_{d,E-DCH}$, $\beta_{ec,E-DCH}$ and $\beta_{hs,E-DCH}$ may e.g. be set to values that are likely to be used if/when High Speed Packet Access (HSPA) is deployed.

In a third step S3 of the exemplifying method it is preferred that an E-TFC or similar indication is obtained. Here, it is preferred that the relation between the power offset factor $\beta_{c,E-DCH}$ for the DPCCH and the power offset $\beta_{ed,E-DCH}$ for the E-DPDCH—e.g. expressed as $\beta_{ed,E-DCH}^2/\beta_{c,E-DCH}^2$—corresponds to a specific E-TFC or similar. As previously described, the ratio $\beta_{ed,E-DCH}^2/\beta_{c,E-DCH}^2$ or similar may e.g. corresponds to a specific entry or similar in a E-TFC table or similar, wherein each entry in the table comprises Bit-Rate Information corresponding to the bit-rate that can be supported and used by the E-DPDCH under a specific relation between the offset factors $\beta_{c,E-DCH}$, $\beta_{ed,E-DCH}$. It is particularly preferred that the relation between the power offset factors $\beta_{c,E-DCH}$, $\beta_{ed,E-DCH}$ is given by any of the expressions (7), (7'), (10), (10'), (11) or (11') described above.

In a fourth step S4 of the exemplifying method it is preferred that a Bit-Rate Information is obtained corresponding to the E-TFC obtained in the previous third step S3. A Bit-Rate Information may e.g. be obtained by a look up in an E-TFC table, e.g. as the one previously discussed with reference to FIG. 5. Hence, assume e.g. that the E-TFC obtained in the third step S3 corresponds to a parameter x1 (which e.g. may be a rational number). This means that an E-TFC comprising the Bit-Rate Information y1 has been pointed out in the E-TFC table in FIG. 5. As previously explained with reference to FIG. 5, it is preferred that the Bit-Rate Information correspond to the bit-rate that can be supported and used by the data channel (E-DPDCH) of the transport channel (E-DCH) in a particular operational environment. Here, it should be added that the entire or parts of the E-TFC table or similar may be downloaded from the communication network 110 or otherwise stored in the bit-rate prediction device 124 as indicated by item 18a in FIG. 3. Alternatively, the bit-rate prediction device 124 may communicate with the network 110 so as to request the Bit-Rate Information in question from the network 110 as the information is needed.

In a fifth step S5 of the exemplifying method it is preferred that the actual future bit-rate that can be supported and used by the data channel E-DPDCH of the E-DCH is obtained from the Bit-Rate Information obtained in the previous fourth step S4. This may require some calculations in case the actual bit-rate is merely defined implicitly by the Bit-Rate Information. It is preferred that the actual bit rate supported via the E-TFC lookup is compensated with the used number of expected transmissions.

In a sixth step S6 of the exemplifying method it is preferred that the method ends.

The invention brings a method that will make it possible to obtain a predicted EUL bit rate in a specific area not using advanced system simulation tools or similar. The proposed method is fast in that sense that the need for CPU/post-processing time is reduced.

The invention is well suited for implementation in typical mobile test equipment targeting drive tests, or equivalent.

The obtained EUL bit rate can be used to predict whether an application requiring a particular Quality of Service (QoS) can be supported by the future radio channel (E-DCH). For example, given a set of predetermined applications wherein each application requires a particular QoS. The obtained bit rate can then be used to predict if a particular application can be supported by the future radio channel (E-DCH). The application in question may e.g. require a QoS equal to or corresponding to; best effort, background, standard excellent load, controlled load or similar. A person skilled in the art realizes that a particular bit rate will most likely support a particular QoS or similar.

It should be added that the bit-rate prediction device 124 comprising the bit-rate prediction control 40 can be arranged so as to perform any one of the methods described above. In particular, the bit-rate prediction control 40 may be a program unit and/or a hardware unit arranged so as to cause the bit-rate prediction device 124 to execute any one of the methods described above.

The present invention has now been described with reference to exemplifying embodiments. However, the invention is not limited to the embodiments described herein. On the contrary, the full extent of the invention is only determined by the scope of the appended claims.

The invention claimed is:

1. A method implemented by a prediction device for predicting a bit rate provided by an enhanced data channel in a future radio channel that will be added to an ordinary data channel in an operational radio channel, the bit-rate provided by the enhanced data channel indicated by the ratio $E_d^{k1}/E_{oc}^{k1}$, wherein $E_d$ is the enhanced data channel power offset, $E_{oc}$ is the ordinary control channel power offset after said addition, and k1 is a constant, the method comprising:

obtaining for the operational radio channel a first transmit power $P_1$, a first quality target $Q_1$, an ordinary control channel power offset $O_c$, and an ordinary data channel power offset $O_d$, obtaining for the future radio channel a second transmit power $P_2$ and a second quality target $Q_2$, and obtaining said ratio $E_d^{k1}/E_{oc}^{k1}$ indicating said bit-rate using the expression $$\left(\frac{P_2 \cdot Q_1}{P_1 \cdot Q_2}\right) \cdot \left(k2 + \frac{O_d^{k1}}{O_c^{k1}}\right) - k3,$$

wherein k2 and k3 are constants.

2. The method according to claim 1, further comprising:

obtaining for the operational radio channel parameters indicative of an orthogonality factor, a path gain, and other users' interference, and obtaining a first experienced interference $I_1$ for the operational radio channel using said indicative parameters and the first transmit power $P_1$, and a second experienced interference $I_2$ for the future radio channel using said indicative parameters and the second transmit power $P_2$, and wherein obtaining said ratio $E_d^{k1}/E_{oc}^{k1}$ indicating said bit-rate comprises using the expression $$\left(\frac{P_2 \cdot Q_1}{P_1 \cdot Q_2} \cdot \frac{I_1}{I_2}\right) \cdot \left(k2 + \frac{O_d^{k1}}{O_c^{k1}}\right) - k3.$$

3. The method according to claim 2, further comprising:

obtaining for the operational radio channel parameters indicative of the ordinary control channel power offset $E_{oc}$, an ordinary data channel power offset $E_{od}$, and a high speed control channel power offset $E_{hs,oc}$ after said addition, and obtaining for the future radio channel parameters indicative of an enhanced control channel power offset $E_c$, and wherein obtaining said ratio $E_d^{k1}/E_{oc}^{k1}$ indicating said bit-rate comprises using the expression $$\left(\frac{P_2 \cdot Q_1}{P_1 \cdot Q_2} \cdot \frac{I_1}{I_2}\right) \cdot \left(K2 + \frac{O_d^{k1}}{O_c^{k1}}\right) - \left(k3 + \frac{E_{od}^{k1}}{E_{oc}^{k1}} + \frac{E_c^{k1}}{E_{oc}^{k1}} + \frac{E_{hs,oc}^{k1}}{E_{oc}^{k1}}\right).$$

4. The method according to claim 1, wherein k1, k2 and k3 are approximately integers.

5. The method according to claim 1, wherein k1 is approximately two, and wherein k2 and k3 are approximately one.

6. The method according to claim 1, wherein the first quality target $Q_1$ is a Signal to Interference Ratio (SIR) for an ordinary control channel in the operational radio channel, and the second quality target $Q_2$ is an SIR for the same control channel after said addition.

7. The method according to claim 1, further comprising:

obtaining by measurements or signaling at a natural or original position or place covered by the operational radio channel at least one of: the first transmit power $P_1$, the first quality target $Q_1$, the ordinary control channel power offset $O_c$, and the ordinary data channel power offset $O_d$.

8. The method according to claim 1, further comprising:

obtaining from a communication network to which the operational radio channel belongs, at least one of: the first transmit power $P_1$, the first quality target $Q_1$, the ordinary control channel power offset $O_c$ and the ordinary data channel power offset $O_d$.

9. The method according to claim 1, further comprising:

predetermining before said addition, at least one of the second transmit power $P_2$ and the second quality target $Q_2$.

10. The method according to claim 1, further comprising:

obtaining an end user bit rate by compensating said obtained bit rate by a target number of transmissions.

11. The method according to claim 1, further comprising:

predicting for the future radio channel, depending on said obtained bit rate, if an application requiring a particular Quality of Service, QoS will be supported by the future channel.

12. The method according to claim 1, wherein said future radio channel is an Enhanced Dedicated Channel (E-DCH) and said operational radio channel is a Dedicated Data Channel (DCH) according to the specifications provided by the Third Generation Partnership Project, 3GPP.

13. A bit-rate prediction device comprising a bit-rate prediction control circuit for predicting a bit rate provided by an enhanced data channel in a future radio channel that will be added to an ordinary data channel in an operational radio channel, the bit-rate provided by the enhanced data channel indicated by the ratio $E_d{}^{k1}/E_{oc}{}^{k1}$, wherein $E_d$ is the enhanced data channel power offset, $E_{oc}$ is the ordinary control channel power offset after said addition, and k1 is a constant, the bit-rate prediction control circuit configured to:
  obtain for the operational radio channel a first transmit power $P_1$, a first quality target $Q_1$, an ordinary control channel power offset $O_c$, and an ordinary data channel power offset $O_d$,
  obtain for the future radio channel a second transmit power $P_2$ and a second quality target $Q_2$, and
  obtain said ratio $E_d{}^{k1}/E_{oc}{}^{k1}$ indicating said bit-rate using the expression $$\left(\frac{P_2 \cdot Q_1}{P_1 \cdot Q_2}\right) \cdot \left(k2 + \frac{O_d^{k1}}{O_c^{k1}}\right) - k3,$$

wherein k2 and k3 are constants.

14. The bit-rate prediction device according to claim 13, wherein the bit-rate prediction control circuit is further configured to:
  obtain for the operational radio channel parameters indicative of an orthogonality factor, a path gain, and other users' interference, and
  obtain a first experienced interference $I_1$ for the operational radio channel using said indicative parameters and the first transmit power $P_1$, and a second experienced interference $I_2$ for the future radio channel using said indicative parameters and the second transmit power $P_2$, and
  obtain said ratio $E_d{}^{k1}/E_{oc}{}^{k1}$ indicating said bit-rate by using the expression $$\left(\frac{P_2 \cdot Q_1}{P_1 \cdot Q_2} \cdot \frac{I_1}{I_2}\right) \cdot \left(k2 + \frac{O_d^{k1}}{O_c^{k1}}\right) - k3.$$

15. The bit-rate prediction device according to claim 14, wherein the bit-rate prediction control circuit is further configured to:
  obtain for the operational radio channel parameters indicative of the ordinary control channel power offset $E_{oc}$, an ordinary data channel power offset $E_{od}$, and a high speed control channel power offset $E_{hs,oc}$ after said addition, and
  obtain for the future radio channel parameters indicative of an enhanced control channel power offset $E_c$, and
  obtain said ratio $E_d{}^{k1}/E_{oc}{}^{k1}$ indicating said bit-rate by using the expression $$\left(\frac{P_2 \cdot Q_1}{P_1 \cdot Q_2} \cdot \frac{I_1}{I_2}\right) \cdot \left(K2 + \frac{O_d^{k1}}{O_c^{k1}}\right) - \left(k3 + \frac{E_{od}^{k1}}{E_{oc}^{k1}} + \frac{E_c^{k1}}{E_{oc}^{k1}} + \frac{E_{hs,oc}^{k1}}{E_{oc}^{k1}}\right).$$

16. The bit-rate prediction device according to claim 13, wherein k1, k2 and k3 are approximately integers.

17. The bit-rate prediction device according to claim 13, wherein k1 is approximately two, and wherein k2 and k3 are approximately one.

18. The bit-rate prediction device according to claim 13, wherein the first quality target $Q_1$ is a Signal to Interference Ratio (SIR) for an ordinary control channel in the operational radio channel, and the second quality target $Q_2$ is an SIR for the same control channel after said addition.

19. The bit-rate prediction device according to claim 13, wherein said future radio channel is an Enhanced Dedicated Channel (E-DCH) and said operational radio channel is a Dedicated Data Channel (DCH) according to the specifications provided by the Third Generation Partnership Project, 3GPP.

20. A computer program product stored on a non-transitory computer readable medium and comprising computer program code that, when executed by a bit-rate prediction device, cause the bit-rate prediction device to predict a bit rate provided by an enhanced data channel in a future radio channel that will be added to an ordinary data channel in an operational radio channel, the bit-rate provided by the enhanced data channel indicated by the ratio $E_d{}^{k1}/E_{oc}{}^{k1}$, wherein $E_d$ is the enhanced data channel power offset, $E_{oc}$ is the ordinary control channel power offset after said addition, and k1 is a constant, the computer program code causing the bit-rate prediction device to:
  obtain for the operational radio channel a first transmit power $P_1$, a first quality target $Q_1$, an ordinary control channel power offset $O_c$, and an ordinary data channel power offset $O_d$,
  obtain for the future radio channel a second transmit power $P_2$ and a second quality target $Q_2$, and
  obtain said ratio $E_d{}^{k1}/E_{oc}{}^{k1}$ indicating said bit-rate using the expression $$\left(\frac{P_2 \cdot Q_1}{P_1 \cdot Q_2}\right) \cdot \left(k2 + \frac{O_d^{k1}}{O_c^{k1}}\right) - k3,$$

wherein k2 and k3 are constants.

* * * * *

UNITED STATES PATENT AND TRADEMARK OFFICE
CERTIFICATE OF CORRECTION

PATENT NO. : 8,391,912 B2  
APPLICATION NO. : 12/999462  
DATED : March 5, 2013  
INVENTOR(S) : Ökvist et al.

Page 1 of 2

It is certified that error appears in the above-identified patent and that said Letters Patent is hereby corrected as shown below:

On the Title Page, in Item (12), under "United States Patent", in Column 1, Line 1, delete "Okvist" and insert -- Ökvist --, therefor.

On the Title Page, in Item (75), under "Inventors", in Column 1, Line 1, delete "Okvist," and insert -- Ökvist, --, therefor.

On the Title Page, in Item (75), under "Inventors", in Column 1, Line 1, delete "Lulea" and insert -- Luleå --, therefor.

On the Title Page, in Item (75), under "Inventors", in Column 1, Line 2, delete "Skelleftea" and insert -- Skellefteå --, therefor.

On the Title Page, in Item (75), under "Inventors", in Column 1, Line 3, delete "Lulea" and insert -- Luleå --, therefor.

On the Title Page, in Item (74), under "Attorney, Agent, or Firm", in Column 2, Line 1, delete "Bennet," and insert -- Bennett, --, therefor.

On the Title Page, in Item (57), under "ABSTRACT", in Column 2, Line 6, delete "E" and insert -- $E_d$ --, therefor.

On the Title Page, in Item (57), under "ABSTRACT", in Column 2, Line 7, delete "E" and insert -- $E_{oc}$ --, therefor.

On the Title Page, in Item (57), under "ABSTRACT", in Column 2, Line 11, delete "O" and insert -- $O_c$ --, therefor.

On the Title Page, in Item (57), under "ABSTRACT", in Column 2, Line 12, delete "O" and insert -- $O_d$ --, therefor.

Signed and Sealed this  
Twentieth Day of August, 2013

Teresa Stanek Rea  
*Acting Director of the United States Patent and Trademark Office*

CERTIFICATE OF CORRECTION (continued)
U.S. Pat. No. 8,391,912 B2

In the Specification:

In Column 1, Line 29, delete "cite" and insert -- site --, therefor.

In Column 6, Line 65, delete "system 110." and insert -- system 100. --, therefor.

In Column 7, Line 8, delete "100." and insert -- 110. --, therefor.

In Column 7, Line 11, delete "net-work" and insert -- network --, therefor.

In Column 11, Line 44, delete "FIG." and insert -- FIGS. --, therefor.

In Column 12, Lines 24-25, delete "power offset factors power offset factors" and insert -- power offset factors --, therefor.

In Column 12, Line 26, delete "power offset factors power offset factors" and insert -- power offset factors --, therefor.

In the Claims:

In Column 13, Line 63, in Claim 1, delete " $\left(\frac{P_2 \cdot Q_1}{P_1 \cdot Q_2}\right)\left(k2 + \frac{O_d^{k_1}}{O_c^{k_1}}\right) - k3.$ " and insert -- $\left(\frac{P_2 \cdot Q_1}{P_1 \cdot Q_2}\right)\left(k2 + \frac{O_d^{k_1}}{O_c^{k_1}}\right) - k3.$ --, therefor.

In Column 15, Line 25, in Claim 13, delete " $\left(\frac{P_2 \cdot Q_1}{P_1 \cdot Q_2}\right)\left(k2 + \frac{O_d^{k_1}}{O_c^{k_1}}\right) - k3.$ " and insert -- $\left(\frac{P_2 \cdot Q_1}{P_1 \cdot Q_2}\right)\left(k2 + \frac{O_d^{k_1}}{O_c^{k_1}}\right) - k3.$ --, therefor.

In Column 16, Line 49, in Claim 20, delete " $\left(\frac{P_2 \cdot Q_1}{P_1 \cdot Q_2}\right)\left(k2 + \frac{O_d^{k_1}}{O_c^{k_1}}\right) - k3.$ " and insert -- $\left(\frac{P_2 \cdot Q_1}{P_1 \cdot Q_2}\right)\left(k2 + \frac{O_d^{k_1}}{O_c^{k_1}}\right) - k3.$ --, therefor.